US009027030B2

(12) United States Patent
Little

(10) Patent No.: US 9,027,030 B2
(45) Date of Patent: May 5, 2015

(54) COMMIT-ONE-PHASE DISTRIBUTED TRANSACTIONS WITH MULTIPLE STARTING PARTICIPANTS

(75) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 1850 days.

(21) Appl. No.: 11/998,611

(22) Filed: Nov. 29, 2007

(65) Prior Publication Data

US 2009/0144750 A1    Jun. 4, 2009

(51) Int. Cl.
  *G06F 9/44*  (2006.01)
  *G06F 9/46*  (2006.01)
  *G06F 13/00*  (2006.01)
  *G06F 3/00*  (2006.01)
  *G06F 13/38*  (2006.01)

(52) U.S. Cl.
  CPC .................................. *G06F 13/385* (2013.01)

(58) Field of Classification Search
  CPC ...................................... G06F 13/385
  See application file for complete search history.

(56) References Cited

U.S. PATENT DOCUMENTS

| 5,428,771 A | 6/1995 | Daniels et al. |
|---|---|---|
| 5,680,610 A | 10/1997 | Smith et al. |
| 5,896,503 A | 4/1999 | Badovinatz et al. |
| 6,012,094 A | 1/2000 | Leymann et al. |
| 6,052,695 A | 4/2000 | Abe et al. |
| 6,205,464 B1 * | 3/2001 | Cobb et al. .................. 718/101 |
| 6,738,971 B2 | 5/2004 | Chandrasekaran et al. |
| 6,785,696 B2 | 8/2004 | Mosher, Jr. et al. |
| 7,152,181 B2 | 12/2006 | Fung et al. |
| 7,206,805 B1 | 4/2007 | McLaughlin, Jr. |
| 7,536,581 B2 | 5/2009 | Fiske |
| 7,620,842 B2 | 11/2009 | Fung et al. |
| 7,685,365 B2 | 3/2010 | Rajwar et al. |
| 7,725,432 B2 | 5/2010 | Barnes et al. |
| 2005/0219929 A1 | 10/2005 | Nava |
| 2006/0095524 A1 | 5/2006 | Kay et al. |
| 2006/0136887 A1 * | 6/2006 | Kaczynski et al. .......... 717/151 |
| 2006/0174224 A1 | 8/2006 | Parkinson et al. |
| 2007/0288387 A1 | 12/2007 | Park et al. |
| 2008/0256094 A1 | 10/2008 | Gupta et al. |
| 2010/0174731 A1 | 7/2010 | Vermeulen et al. |

OTHER PUBLICATIONS

OrbixOTS Programmer's and Administrator's Guide; IONA Technologies PLC; Sep. 2000; 23 excerpted pages; full pdf available http://documentation.progress.com/output/Iona/orbix/gen3/33/pdf/orbixots33_pguide.pdf.*

Abdallah, Maha, et al., "One-Phase Commit: Does it Make Sense?", Lab. PRiSM, Univ. de Versailles, 11 pages, Dec. 14-16, 1998 ISBN 0818686030.

(Continued)

*Primary Examiner* — Andy Ho
*Assistant Examiner* — Kimberly Jordan
(74) *Attorney, Agent, or Firm* — Lowenstein Sandler LLP

(57) ABSTRACT

A commit query is sent from a coordinator of a two-phase commit distributed transaction to each participant of the distributed transaction, wherein each participant can respond with one of a commit message, an abort message, or a read-only message. A read-only message is received from all but one participant of the distributed transaction. A one-phase commit distributed transaction is initiated for the one participant that did not respond with a read-only message.

16 Claims, 4 Drawing Sheets

(56) References Cited

OTHER PUBLICATIONS

Lampson, Butler, et al. "A New Presumed Commit Optimization for Two Phase Commit", Feb. 10, 1993, CRL 93/1, Digital Equipment Corporation, Cambridge Research Laboratory Technical Report Series. Copyright Digital Equipment Corporation 1993, 26 pages.

Samaras, George, et al., "Two-Phase Commit Optimization and Tradeoffs in the Commercial Environment", 1063-6382/93, Copyright 1993 IEEE, pp. 520-529.

Abdallah, M., et al., "One-phase commit: does it make sense?", Parallel and Distributed Systems, 1998, Proceedings, 1998 International Conference, Dec. 14-16, 1998 pp. 182-192.

"JBoss Transactions 4.2.3, JTS Programmers Guide", © 2006, 117 pages.

Johnson, Rod, et al., "Spring java/j2ee Application Framework, The Spring Framework—Reference Documentation", Version 2.5.6, © 2004-2008, 590 pages.

Lampson, Butler and Lomet, David, "A New Presumed Commit Optimization for Two Phase Commit", Cambridge Research Laboratory, Technical Report Series, Feb. 10, 1993, 26 pages.

Samaras, George, et al., "Two-Phase Commit Optimizations and Tradeoffs in the Commercial Environment", IBM Distributed Systems Architecture, IBM Almaden Research Center, pp. 520-529.

King, Erik, "Perpetual Enterprise Management Service (PEMS) for C2 SOA Deployments", 10th International Command and Control Research and Technology Symposium, Jun. 14, 2005, pp. 1-23, Virginia.

King, Erik, "Perpetual Enterprise Management Service (PEMS) for Next Generation SOA-based Command & Control Systems", Science Applications International Corporation (SAIC), Mar. 28, 2005, 26 pages, Virginia.

Liu, et al., "The Performance of Two-phase Commit Protocols in the Presence of Site Failures", In Proceedings of the 24th International Symposium on Fault-Tolerant Comptuing, 1994.

Broder, Andrei, et al. "Network Applications of Bloom Filters: A Survey," Copyright A.K. Peters, Ltd. 1542-795/04, Internet Mathematics vol. I, No. 4, pp. 485-509, 2002.

"JBoss Transactions 4.2.3, Failure Recovery Guide", Apr. 4, 2001, 35 pages, JBoss Inc.

Little, M.C., et al., "A Method for Combining Replication With Caching," Oct. 1999, 7 pages, appeared in Proceedings of the International Workshop on Realiable Middleware Systems, Lausanne, Switzerland.

Stern, Ulrich, et al, "A New Scheme for Memory-Efficient Probablistic Verification," Stanford University Department fo Computer Science, Standord, CA 16 pages, 1996.

IONA Technologies PLC, "OrbixOTS Programmer's and Administrator's Guide," Sep. 2000, 312 pages.

* cited by examiner

COMMIT-ONE-PHASE DISTRIBUTED TRANSACTIONS WITH MULTIPLE STARTING PARTICIPANTS

TECHNICAL FIELD

Embodiments of the present invention relate to distributed transactions, and more specifically to improving efficiency of distributed transactions.

BACKGROUND

Distributed transactions are often performed on distributed computing systems. A distributed transaction is a set of operations that update shared objects. Distributed transactions must satisfy the properties of Atomicity, Consistency, Isolation and Durability, known commonly as the ACID properties. According to the Atomicity property, either the transaction successfully executes to completion, and the effects of all operations are recorded, or the transaction fails. The Consistency property requires that the transaction does not violate integrity constraints of the shared objects. The Isolation property requires that intermediate effects of the transaction are not detectable to concurrent transactions. Finally, the Durability property requires that changes to shared objects due to the transaction are permanent.

To ensure the Atomicity property, all participants of the distributed transaction must coordinate their actions so that they either unanimously abort or unanimously commit to the transaction. A two-phase commit protocol is commonly used to ensure Atomicity. Under the two-phase commit protocol, the distributed system performs the commit operation in two phases. In the first phase, commonly known as the prepare phase or request phase, a coordinator node (a node in the distributed computing system managing the transaction) asks all participant nodes whether they are willing to commit to the transaction. During the second phase, commonly known as the commit phase, the coordinator node determines whether the transaction should be completed. If during the prepare phase all participant nodes committed to the transaction, the coordinator node successfully completes the transaction. If during the prepare phase one or more participant nodes failed to commit to the transaction, the coordinator node does not complete the transaction.

The two-phase commit protocol, although widely used, introduces substantial delay in transaction processing. To reduce this delay, some conventional distributed systems have implemented a read-only optimization to the two-phase commit protocol. Using the read-only optimization, a participant node can respond during the prepare phase with a read-only response. The read-only response notifies the coordinator node that the sender of the read-only response will not undergo a state change due to the transaction. Therefore, it does not matter to that participant node whether or not the transaction is successful. The read-only response causes that participant node to be dropped out of the transaction. However, even if all participant nodes return a read-only response, the coordinator continues the two-phase commit protocol, and initiates the commit phase once responses are received from all participant nodes.

Other conventional distributed systems have implemented a one-phase commit optimization. Under the conventional one-phase commit optimization, if there is only a single node participating in a transaction, the prepare phase is skipped. However, the one-phase commit optimization is limited to transactions having a single participant.

BRIEF DESCRIPTION OF THE DRAWINGS

The present invention is illustrated by way of example, and not by way of limitation, in the figures of the accompanying drawings and in which.

DETAILED DESCRIPTION

Figure 1A:
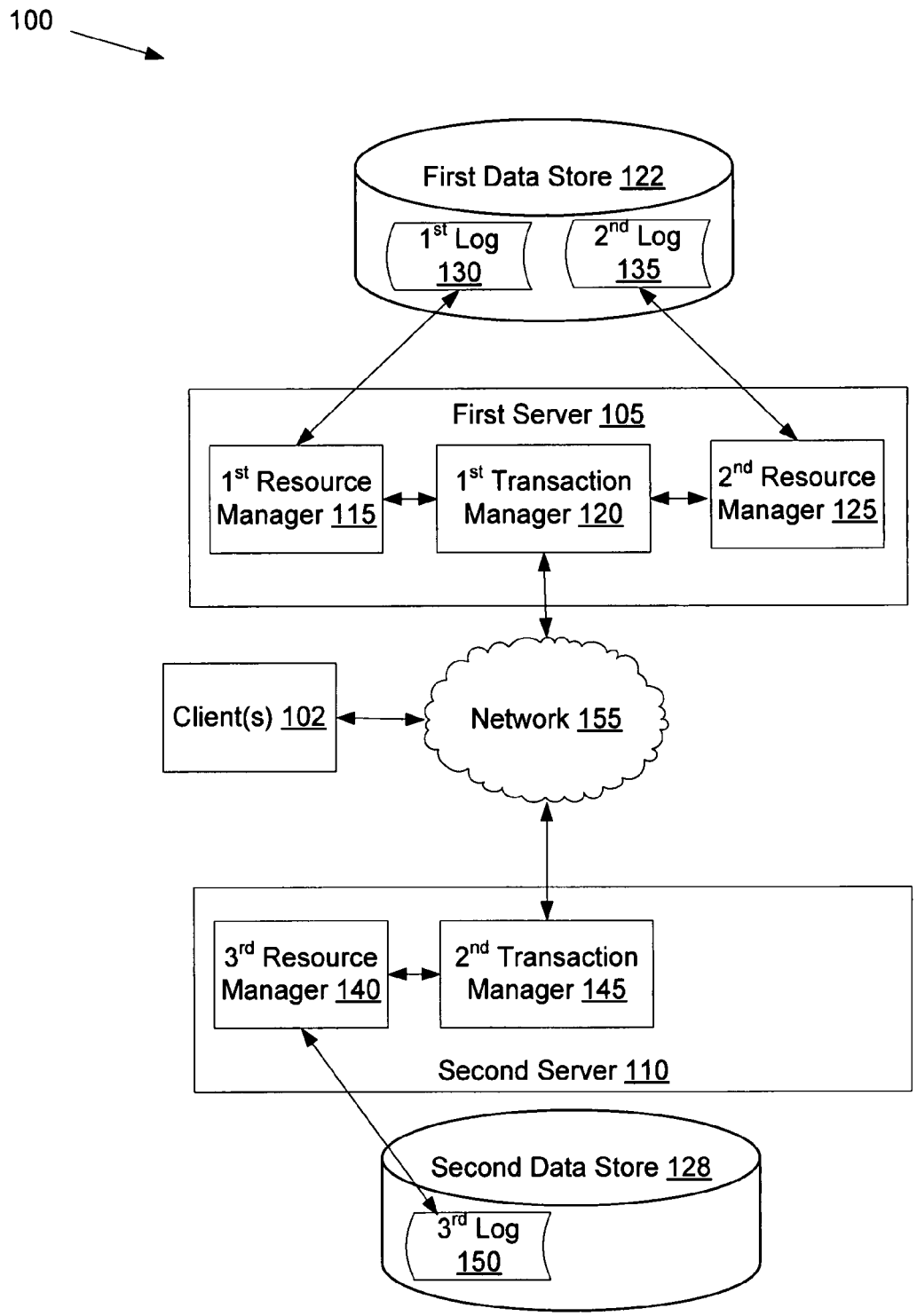
FIG. 1A illustrates an exemplary distributed computing system, in which embodiments of the present invention may operate.

Described herein is a method and apparatus for performing distributed transactions. In one embodiment, a commit query is sent from a coordinator of a two-phase commit distributed transaction to each participant of the distributed transaction. The coordinator and the participants may be nodes of a distributed system such as a database or enterprise service bus. Each participant can respond with a commit message, an abort message, or a read-only message. If a read-only message is received from all but one participant of the distributed transaction, a one-phase commit distributed transaction is initiated for the one participant that did not respond with a read-only message. Otherwise, the two-phase commit distributed transaction continues.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "initiating", "determining", "deploying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1A illustrates an exemplary distributed computing system 100, in which embodiments of the present invention may operate. The distributed computing system 100 may include a service oriented architecture (SOA) (an information system architecture that organizes and uses distributed capabilities (services) for one or more applications). An SOA provides a uniform means to offer, discover, interact with and use capabilities (services) distributed over a network. Through the SOA, applications may be designed that combine loosely coupled and interoperable services. In one embodiment, the distributed computing system 100 includes an enterprise service bus (ESB). An ESB is an event-driven and standards-based messaging engine that provides services for more complex architectures. The ESB provides an infrastructure that links together services and clients to enable distributed applications and processes. The ESB may be implemented to facilitate an SOA. In one embodiment, the ESB is a single bus that logically interconnects all available services and clients. Alternatively, the ESB may include multiple busses, each of which may logically interconnect different services and/or clients.

In one embodiment, the distributed computing system 100 includes one or more clients 102, a first server 105 and a second server 110 connected via a network 155. Alternatively, the distributed computing system may only include a single server and/or the client 102 may be directly connected with the first server 105 or the second server 110.

Client(s) 102 may be, for example, personal computers (PC), palm-sized computing devices, personal digital assistants (PDA), etc. Client(s) 102 may also be applications run on a PC, server, database, etc. In the SOA, client(s) 102 include applications that access services. Client(s) 102 may be fat clients (client that performs local processing and data storage), thins client (client that performs minimal or no local processing and minimal to no data storage), and/or hybrid clients (client that performs local processing but little to no data storage).

Each of the first server 105 and second server 110 may host services, applications and/or other functionality that is available to clients 102 on the distributed computing system 100. The first server 105 and second server 110 may be a single machine, or may include multiple interconnected machines (e.g., machines configured in a cluster). The network 155 may be a private network (e.g., local area network (LAN), wide area network (WAN), intranet, etc.), a public network (e.g., the Internet), or a combination thereof.

In one embodiment, the first server 105 includes a first transaction manager 120, a first resource manager 115 and a second resource manager 125. A transaction manager is a software module that coordinates multiple participants during a distributed transaction. A participant may be another transaction manager (e.g., second transaction manager 145) or a local resource manager (e.g., first resource manager 115 and second resource manager 125). Coordinating a distributed transaction includes determining whether each participant can commit to a transaction, directing each participant to commit if all are able, and directing each participant to rollback if not all participating nodes are able to commit.

In one embodiment, first transaction manager 120 acts as a master coordinator node, and coordinates a distributed transaction between first resource manager 115, second resource manager 125 and second transaction manager 145. A master coordinator node is a transaction manager that acts on behalf of a process that initiates a distributed transaction (e.g., by initiating a commit operation) to coordinate all participants of the distributed transaction. A master coordinator node must arrive at a commit or abort decision and propagate that decision to all participants. In one embodiment, first transaction manager 120 is configured to initiate a two-phase commit distributed transaction if there are multiple resource managers and/or transaction managers that will participate in the transaction. The transaction manager 120 may further be configured to convert the two-phase commit transaction into a one-phase commit transaction if it is determined that only a single participant (e.g., a resource manager) will undergo a state change from the transaction. This is discussed in greater detail below with reference to FIG. 1B.

Returning to FIG. 1A, in another embodiment, first transaction manager 120 may act as an intermediate coordinator node, and coordinate a distributed transaction between only first resource manager 115 and second resource manager 125. An intermediate coordinator node is a transaction manager that acts on behalf of a process that participates in a distributed transaction to coordinate local resource managers and/or additional transaction managers that are participants in the distributed transaction. An intermediate coordinator node gathers information about the participants that it manages, and reports the information to a master coordinator node. An intermediate coordinator node also receives commit or abort decisions from a master coordinator node, and propagates the decisions to participants that it manages.

A resource manager (e.g., first resource manager 115, second resource manager 125 and third resource manager 140) is a software module that manages a persistent and stable storage system. Examples of resource managers include databases and file managers.

In one embodiment, first server 105 is coupled with a first data store 122. First data store may include a file system, a database, or other data storage arrangement. In one embodiment, first data store 122 is internal to first server 105. Alternatively, first data store 122 may be external to first server 105, and connected with first server 105 either directly or via a network. In one embodiment, each of the first resource manager 115 and the second resource manager 125 maintains a log (e.g., first log 130 and second log 135) on first data store 122. The log may be an undo log (log of committed changes that occur during a distributed transaction) and/or a redo log (log of uncommitted changes that occur during a distributed transaction). The redo log and/or undo log can be used to rollback any changes that occurred during a distributed transaction if the transaction is aborted.

Each resource manager that participates in a distributed transaction may be a participant node of the transaction. During a prepare phase of a two-phase commit distributed transaction, a participant node is asked whether it can commit to the transaction by a coordinator node (e.g., an intermediate coordinator node or a master coordinator node). If the resource manager can commit to the transaction, it sends a commit response to the coordinator node. If the resource manager cannot commit to the transaction, it sends an abort message to the coordinator node. Alternatively, if the resource manager will not undergo a state change from the distributed transaction, it can send a read-only response to the coordinator node. The resource manager is then dropped out of the transaction, and will not later be directed to commit or abort during a commit phase.

During a commit phase of a two-phase commit distributed transaction, each resource manager receives a commit command if all resource managers indicated that they were able to commit. If one or more of the participating resource managers sent an abort response, then all resource managers receive an abort command during the commit phase. Resource managers that responded during the prepare phase with a read-only response receive no commands during the commit phase.

In one embodiment, the second server 110 includes a second transaction manager 145 and a third resource manager 140. The second transaction manager 145 may coordinate the third resource manager 140 and/or the first transaction manager 120 during distributed transactions. For example, if the second transaction manager initiates a distributed transaction, it may send a commit query to the third resource manager 140 and to the first transaction manager 120. In one embodiment, second transaction manager 145 is combined with third resource manager 140 into a single module. Accordingly, third resource manager 140 may act as both a resource manager and a transaction manager (e.g., may coordinate transactions and/or participate in transactions). The third resource manager 140 may be coupled with a second data store 128, on which it may maintain a third log 150.

Figure 1B:
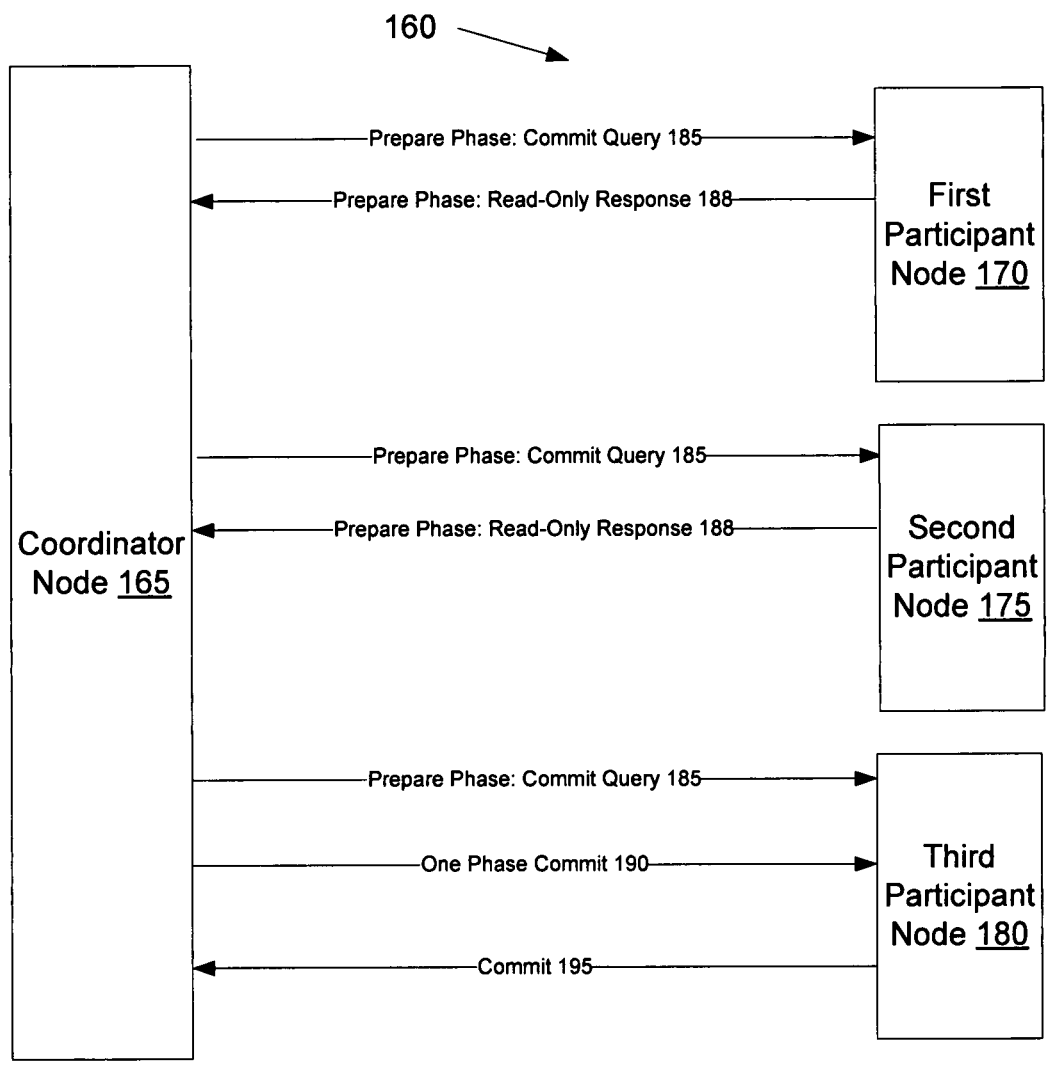
FIG. 1B is a transaction diagram illustrating messages flowing through a distributed computing system, in accordance with one embodiment of the present invention.

FIG. 1B is a transaction diagram illustrating messages flowing through a distributed computing system 160, in accordance with one embodiment of the present invention. In one embodiment, the distributed computing system 160 includes a coordinator node 165 and multiple participant nodes (e.g., first participant node 170, second participant node 175 and third participant node 180). Each node represents a specific resource manager or transaction manager that participates in a distributed transaction. Each node is connected with each other node directly or via a network, which may be a private network (e.g., local area network (LAN), wide area network (WAN), intranet, etc.), a public network (e.g., the Internet), or a combination thereof.

In one embodiment, coordinator node 165 includes a transaction manager that initiates and manages a specific distributed transaction. Managing the distributed transaction includes determining whether each participating node 170, 175, 180 can commit to a transaction, directing each participating node 170, 175, 180 to commit if all are able, and directing each participating node 170, 175, 180 to rollback (undo changes caused by the transaction) if not all participating nodes are able to commit.

Any node that includes a transaction manager in the distributed computing system 160 is capable of operating as a coordinator node 165. Generally, it is a node at which a transaction is begun or requested that operates as the coordinator node 165 for that distributed transaction. However, it is not a requirement that a node that begins a transaction act as coordinator node 165 for that transaction. Moreover, a coordinator node 165 can hand responsibility over to another node, causing that other node to become the coordinator node 165.

In one embodiment, the coordinator node 165 coordinates a two-phase commit distributed transaction between the first participant node 170, the second participant node 175, and the third participant node 180. In another embodiment, the coordinator node 165 both coordinates and participates in a two-phase commit transaction. During a prepare phase of the two-phase commit transaction, the coordinator node 165 sends a commit query 185 to each of the participant nodes asking whether they can commit to the transaction. The coordinator node 165 then waits for a response from each of the participant nodes 170, 175, 180.

Each participant node 170, 175, 180 can respond to the commit query 185 with a commit response, an abort response, or a read-only response. In one embodiment, the first participant node 170 and the second participant node 175 transmit a read-only response 188 to the coordinator node 165. The coordinator node 165 then drops the first participant node 170 and the second participant node 175 out of the transaction. Therefore, no additional message will be sent to or received from the first participant node 170 or the second participant node 175 during the transaction. In a further embodiment, in which coordinator node 165 participates in the transaction, the coordinator node 165 issues a read-only message to itself in addition to receiving read-only messages from the first participant node 170 and second participant node 175.

Since all but one of the participant nodes have returned read-only responses, and thus been dropped out of the transaction, any commit or abort decision made by the third participant node 180 will control the outcome of the transaction. Therefore, coordinator node 165 converts the two-phase distributed transaction into a one-phase distributed transaction. As a one-phase distributed transaction, the transaction is committed or aborted as soon as the third participant node makes a commit or abort decision. This reduces a number of messages that are transmitted over the distributed computing system 160, and reduces delay in executing the transaction.

In one embodiment, coordinator node 165 transmits a one-phase commit message 190 to the third participant node 180 directing it to commit or abort immediately upon making a commit or abort decision, rather than waiting for a further commit or abort command from the coordinator node 165. In one embodiment, the third participant node 180 commits to the transaction, and sends a commit message 195 to the coordinator node 165.

Figure 2:
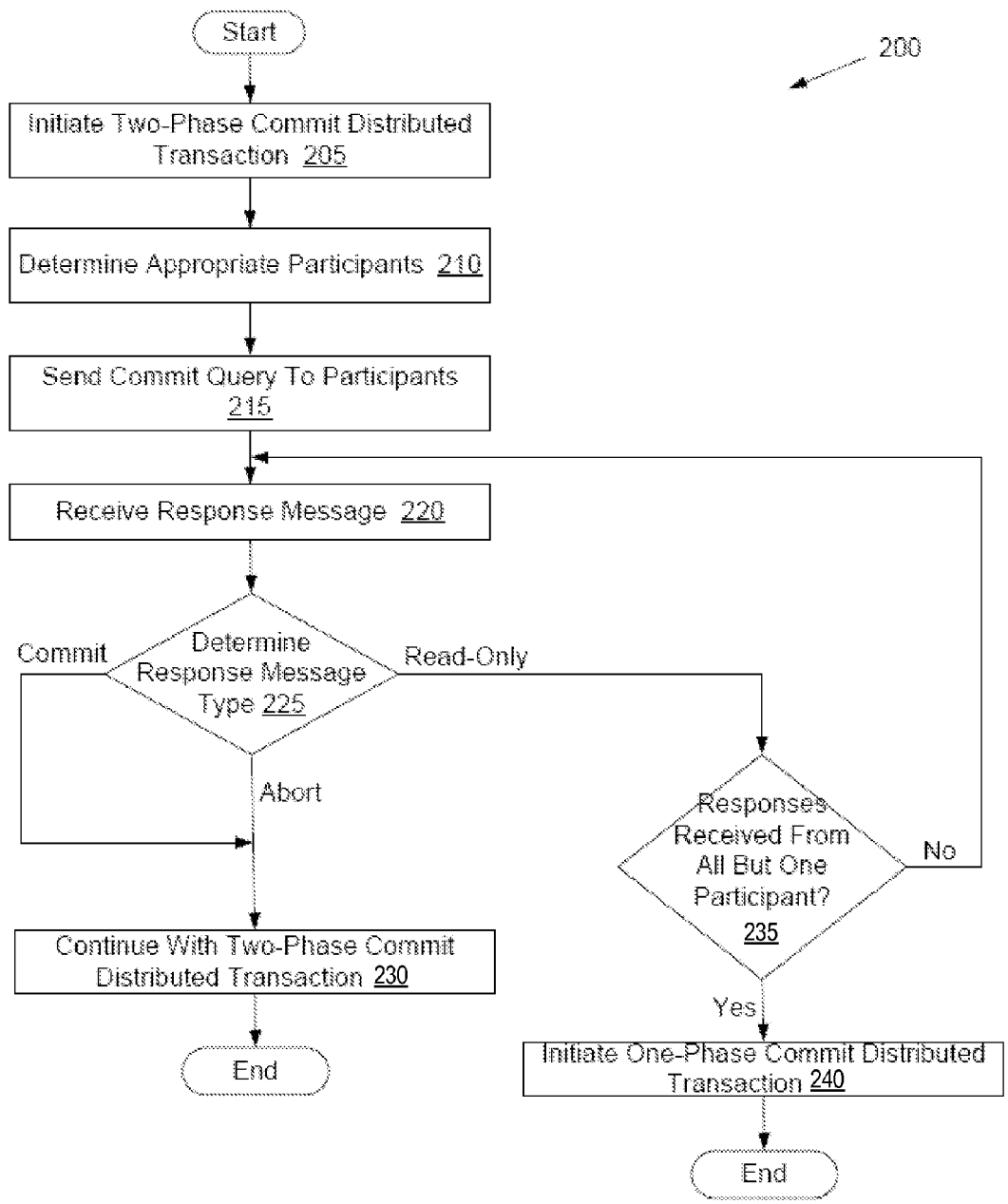
FIG. 2 illustrates a flow diagram of one embodiment for a method of optimizing a two-phase commit distributed transaction.

FIG. 2 illustrates a flow diagram of one embodiment for a method 200 of optimizing a two-phase commit distributed transaction. The method is performed by processing logic that comprises hardware (e.g., circuitry, dedicated logic, programmable logic, microcode, etc.), software (such as instructions run on a processing device), or a combination thereof. In one embodiment, method 200 is performed by coordinator node 165 of FIG. 1B. In another embodiment, method 200 is performed by first transaction manager 120 of FIG. 1A.

Referring to FIG. 2, method 200 includes initiating a two-phase commit distributed transaction (block 205). At block 210, appropriate participants for the distributed transaction are determined. Appropriate participants include resource managers that will contribute data or services to the transaction. Appropriate participants may be determined by broadcasting a transaction participation query, and receiving responses from all nodes that will participate in the queried transaction. Alternatively, appropriate participants may be determined, for example, based on a nature of the transaction, an initiator of the transaction, or other criteria. At block 215, a commit query is sent to each of the determined participants.

At block 220, a response message is received from a participant. At block 225, processing logic determines whether the response message is a commit response, an abort response or a read-only response. If the response message is a commit response or an abort response, the method proceeds to block 230, and processing logic continues with a two-phase commit distributed transaction. If the response message is a read-only response, the method proceeds to block 235.

At block 235, processing logic determines whether responses have been received from all but one participant. If responses have not been received from all but one participant, the method proceeds to block 220. If read-only responses have been received from all but one participant, the method proceeds to block 240. At block 240, a one-phase commit distributed transaction is initiated for the remaining participant. Initiating the one-phase commit transaction may include converting the two-phase commit transaction into a one-phase commit transaction. As a one-phase commit transaction, the transaction may be completed or aborted immediately upon a commit or abort decision by the remaining participant. The method then ends.

Figure 3:
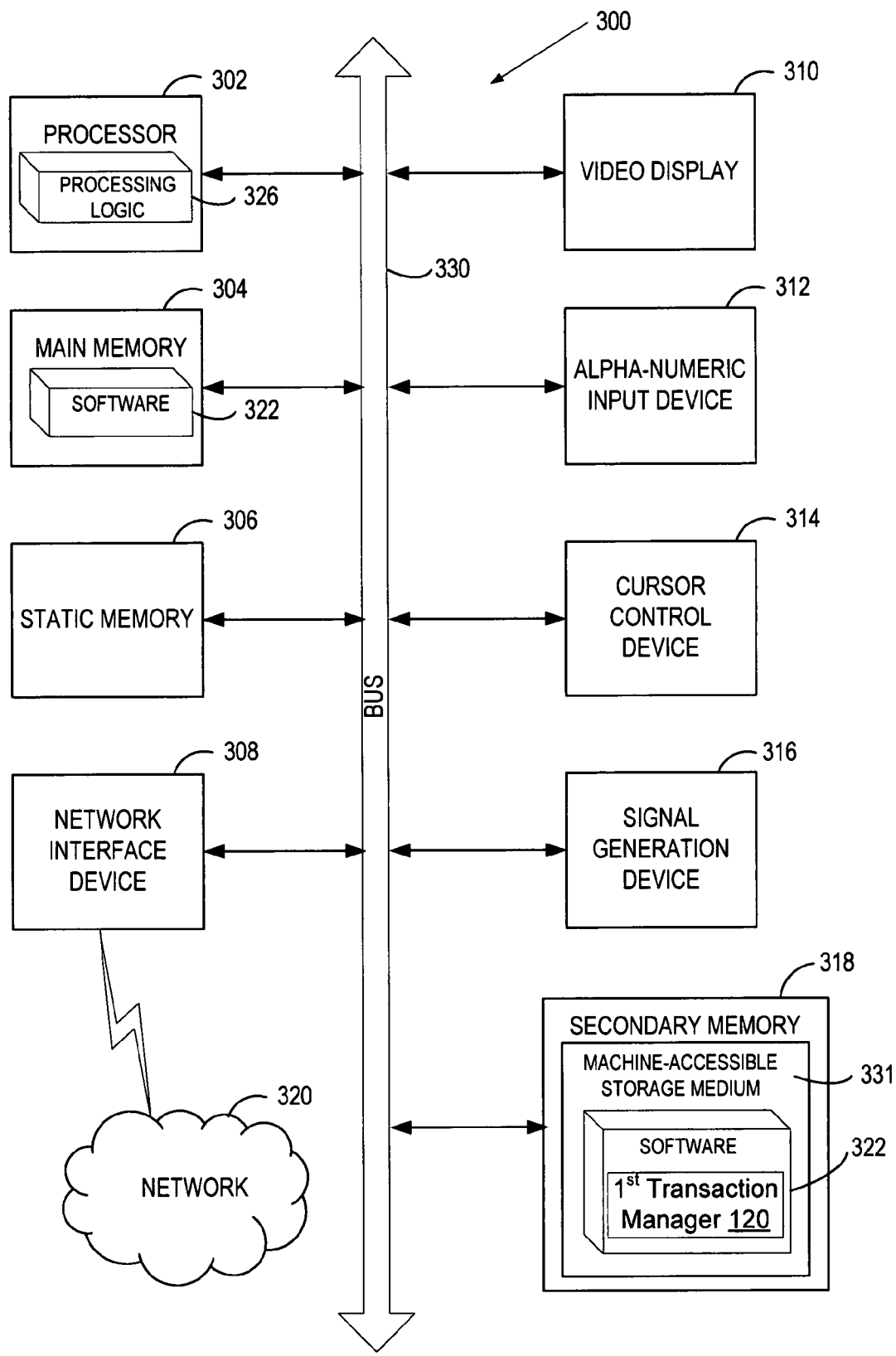
FIG. 3 illustrates a block diagram of an exemplary computer system, in accordance with one embodiment of the present invention.

FIG. 3 illustrates a diagrammatic representation of a machine in the exemplary form of a computer system 300 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 300 includes a processor 302, a main memory 304 (e.g., read-only memory (ROM), flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a secondary memory 318 (e.g., a data storage device), which communicate with each other via a bus 330.

Processor 302 represents one or more general-purpose processing devices such as a microprocessor, central processing unit, or the like. More particularly, the processor 302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 302 may also be one or more special-purpose processing devices such as an application specific integrated circuit (ASIC), a field programmable gate array (FPGA), a digital signal processor (DSP), network processor, or the like. Processor 302 is configured to execute the processing logic 326 for performing the operations and steps discussed herein.

The computer system 300 may further include a network interface device 308. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 316 (e.g., a speaker).

The secondary memory 318 may include a machine-readable storage medium (or more specifically a computer-readable storage medium) 331 on which is stored one or more sets of instructions (e.g., software 322) embodying any one or more of the methodologies or functions described herein. The software 322 may also reside, completely or at least partially, within the main memory 304 and/or within the processing device 302 during execution thereof by the computer system 300, the main memory 304 and the processing device 302 also constituting machine-readable storage media. The software 322 may further be transmitted or received over a network 320 via the network interface device 308.

The machine-readable storage medium 331 may also be used to store a transaction manager and/or resource manager (e.g., the first transaction manager 120, first resource manager 115, second transaction manager 145 etc. of FIG. 1A), and/or a software library containing methods that call transaction managers. While the machine-readable storage medium 331 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:
  receiving, by a new master coordinator node executed by a processing device, a request from a previous master coordinator node to assume control of a two-phase commit distributed transaction, wherein the previous master coordinator node sent a commit query for the two-phase commit distributed transaction to a plurality of participants of the two-phase commit distributed transaction without first ordering the plurality of participants, wherein at least one of the plurality of participants is an intermediate coordinator node that forwards the commit query to one or more additional participants that are managed by the intermediate coordinator node, wherein each participant can respond with one of a commit message, an abort message, or a read-only message;
  receiving, by the new master coordinator node, a read-only message from all but one participant of the distributed transaction, wherein a read-only message is received from the intermediate coordinator node in response to the intermediate coordinator node receiving read-only messages from all of the one or more additional participants; and
  initiating, by the new master coordinator node, a one-phase commit distributed transaction for the one participant that did not respond with a read-only message.

2. The method of claim 1, wherein a participant responds with a read-only message if a state of the participant will not be changed by the distributed transaction.

3. The method of claim 1, wherein at least one of the new master coordinator node or the previous master coordinator node removes participants that respond with a read-only message from the distributed transaction.

4. The method of claim 1, wherein the distributed transaction is a transaction of a database system.

5. The method of claim 1, wherein initiating the one-phase commit distributed transaction comprises converting the two-phase commit distributed transaction into a one-phase commit distributed transaction.

6. The method of claim 1, further comprising:
  initiating the two phase commit transaction at the previous master coordinator node.

7. A non-transitory computer readable storage medium including instructions that, when executed by a processing device, cause the processing device to perform operations comprising:
  sending, by the processing device that executes a master coordinator of a two-phase commit distributed transaction, a commit query from the master coordinator of the two-phase commit distributed transaction to a plurality of participants of the distributed transaction without first ordering the plurality of participants, wherein at least one of the plurality of participants is an intermediate coordinator that forwards the commit query to one or more additional participants that are managed by the intermediate coordinator, wherein each participant can respond with one of a commit message, an abort message, or a read-only message;
  receiving, by the processing device, a read-only message from all but one participant of the distributed transaction, wherein a read-only message is received from the intermediate coordinator in response to the intermediate coordinator receiving read-only messages from all of the one or more additional participants; and
  initiating, by the processing device, a one-phase commit distributed transaction for the one participant that did not respond with a read-only message.

8. The non-transitory computer readable storage medium of claim 7, wherein a participant responds with a read-only message if a state of the participant will not be changed by the distributed transaction.

9. The non-transitory computer readable storage medium of claim 7, wherein the master coordinator removes participants that respond with a read-only message from the distributed transaction.

10. The non-transitory computer readable storage medium of claim 7, wherein the distributed transaction is a transaction of a database system.

11. The non-transitory computer readable storage medium of claim 7, wherein initiating the one-phase commit distributed transaction comprises converting the two-phase commit distributed transaction into a one-phase commit distributed transaction.

12. The non-transitory computer readable storage medium of claim 7, the operations further comprising:
  initiating the two phase commit transaction at the master coordinator.

13. A distributed computing system comprising:
  a data store; and
  a processing device, coupled to the data store, to execute a first transaction manager that is to manage transactions for a master coordinator node, the first transaction manager to initiate a two-phase commit distributed transaction, to send a commit query for the two-phase commit distributed transaction to a plurality of participant nodes without first ordering the plurality of participant nodes, wherein at least one of the plurality of participant nodes is an intermediate coordinator node having a second transaction manager that forwards the commit query to one or more additional participant nodes that are managed by the second transaction manager, to receive a read-only message from all but one of the plurality of participant nodes, wherein a read-only message is received from the intermediate coordinator node in response to the second transaction manager receiving read-only messages from all of the one or more additional participant nodes, and to convert the two-phase commit distributed transaction to a one-phase commit distributed transaction for the one of the plurality of nodes that did not respond with a read-only message.

14. The distributed computing system of claim 13, wherein the plurality of participant nodes and the master coordinator node are nodes of a database system.

15. The distributed computing system of claim 13, wherein each of the plurality of participant nodes is to respond with a read-only message if a state of the participant node will not be changed by the distributed transaction.

16. The distributed computing system of claim 13, wherein the first transaction manager is to remove participant nodes that respond with a read-only message from the distributed transaction.

* * * * *